United States Patent
Kawaguchi et al.

(10) Patent No.: US 8,098,843 B2
(45) Date of Patent: Jan. 17, 2012

(54) SOUND SOURCE DIRECTION DETECTING APPARATUS, SOUND SOURCE DIRECTION DETECTING METHOD, AND SOUND SOURCE DIRECTION DETECTING CAMERA

(75) Inventors: Takayoshi Kawaguchi, Kanagawa (JP); Yasuhiro Kodama, Kanagawa (JP); Yohei Sakuraba, Kanagawa (JP)

(73) Assignee: Sony Corporation (JP)

( * ) Notice: Subject to any disclaimer, the term of this patent is extended or adjusted under 35 U.S.C. 154(b) by 786 days.

(21) Appl. No.: 12/284,455

(22) Filed: Sep. 22, 2008

(65) Prior Publication Data

US 2009/0086993 A1 Apr. 2, 2009

(30) Foreign Application Priority Data

Sep. 27, 2007 (JP) ................. P2007-252734

(51) Int. Cl.
*H04R 3/00* (2006.01)
*H04N 7/00* (2006.01)
(52) U.S. Cl. .................... 381/92; 348/14.1; 348/E7.001
(58) Field of Classification Search .................... 381/92; 348/14.1, E7.001
See application file for complete search history.

(56) References Cited

FOREIGN PATENT DOCUMENTS

| JP | 07-336790 A | | 12/1995 |
|---|---|---|---|
| JP | 10074138 A | | 3/1998 |
| JP | 2000284793 A | | 10/2000 |
| JP | 2004-012151 A | | 1/2004 |
| JP | 2004012151 A | * | 1/2004 |
| JP | 2004325127 A | | 11/2004 |
| JP | 2006-194700 A | | 7/2006 |
| JP | 2006194700 A | * | 7/2006 |

OTHER PUBLICATIONS

Office Action from Japanese Application No. 2007-252734, dated Jun. 28, 2011.
Hisafumi Yoshida, Improvement of the reverberation tolerance in the sound source separation method based on harmonics structure and sound source direction, Institute of Electronics, Information and Communication Engineers technical study report vol. 103 No. 27, Japan, Corporate judicial person Institute of Electronics, Information and communication Engineers, Apr. 2003, vol. 103, p. 31-36. (English translation of Japanese Office Action indicates degree of relevance).
Shou Kou, Noboru Onishi, Noboru Sugie, Plural sound source localization systems using the difference histogram, Robotics Society of Japan magazine vol. 9 No. 1, Japan, Corporate judicial person Robotics Society of Japan, Feb. 1991, vol. 9, p. 29-38. (English translation of Japanese Office Action indicates degree of relevance).

* cited by examiner

*Primary Examiner* — Marcos D. Pizarro
(74) *Attorney, Agent, or Firm* — Lerner, David, Littenberg, Krumholz & Mentlik, LLP

(57) ABSTRACT

Disclosed herein is a sound source direction detecting apparatus including: a plurality of microphones configured to collect sounds from a sound source in order to form an audio frame; a frequency decomposition section configured to decompose the audio frame into frequency components; an error range determination section configured to determine the effects of noises collected together with the sounds as an error range relative to phases; a power level dispersion section configured to disperse power levels of the sounds for each of the frequency components decomposed by the frequency decomposition section, on the basis of the error range determined by the error range determination section; a power level addition section configured to add the power levels dispersed by the power level dispersion section; and a sound source direction detection section configured to detect the direction of the sound source based on the phase at which is located the highest of the power levels added by the power level addition section.

8 Claims, 13 Drawing Sheets

AN EXAMPLE OF DISPERSED ADDITIONAL POWER LEVELS

AN EXAMPLE OF ADDITIONAL POWER LEVELS FOR ALLOWING THE SOUND DIRECTION TO BE ESTIMATED

☒ OUTPUT VALUES OF 4kHz SOUND WAVE
☐ OUTPUT VALUES OF 3kHz SOUND WAVE

HISTOGRAM EXAMPLE IN WHICH PHASES ARE ROTATED AND ADDED POWER LEVELS ARE DISPERSED IN MULTIPLE DIRECTIONS

HISTOGRAM EXAMPLE IN WHICH THE EFFECTS OF ADDED POWER LEVELS DISPERSED IN MULTIPLE DIRECTIONS ARE REMOVED

FIG.8A
HISTOGRAM EXAMPLE
OF A FIRST FRAME
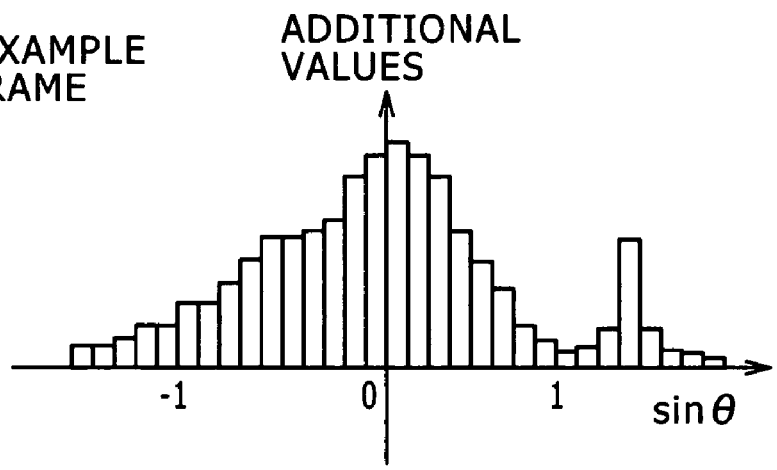
A HISTOGRAM IS CALCULATED
INDEPENDENTLY PER FRAME 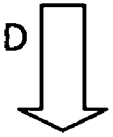
FIG.8B
HISTOGRAM EXAMPLE
OF A SECOND FRAME
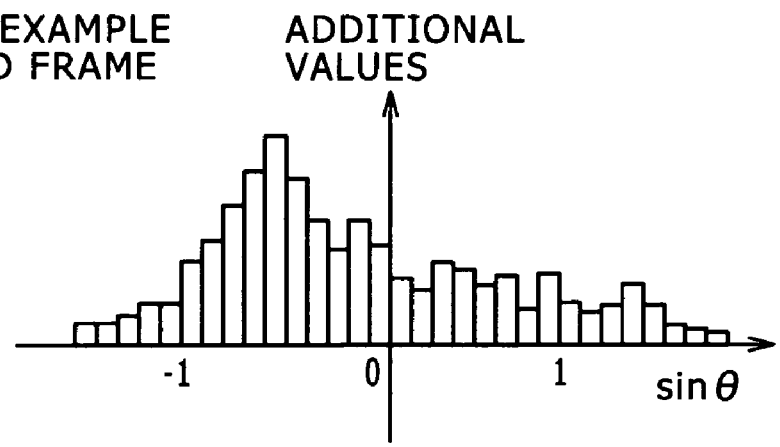
THE ESTIMATED DIRECTION
IS DEVIATED FROM ONE
FRAME TO ANOTHER

FIG. 10A HISTOGRAM EXAMPLE OF THE FIRST FRAME
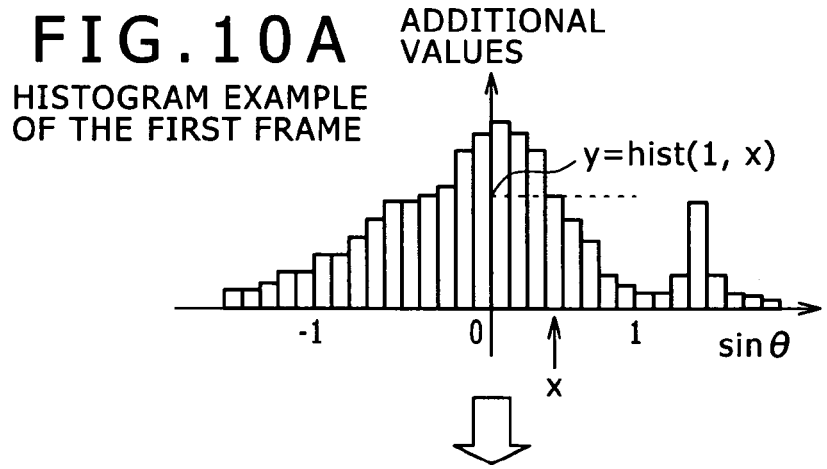
FIG. 10B HISTOGRAM EXAMPLE OF THE FIRST FRAME SMOOTHED IN SPATIAL DIRECTION
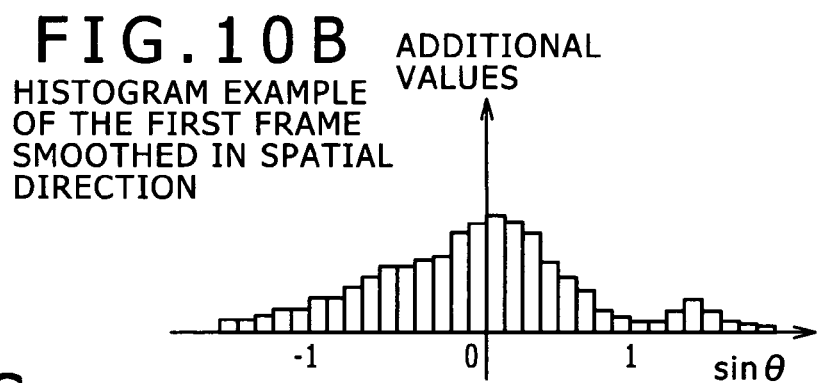
FIG. 10C HISTOGRAM EXAMPLE OF THE SECOND FRAME
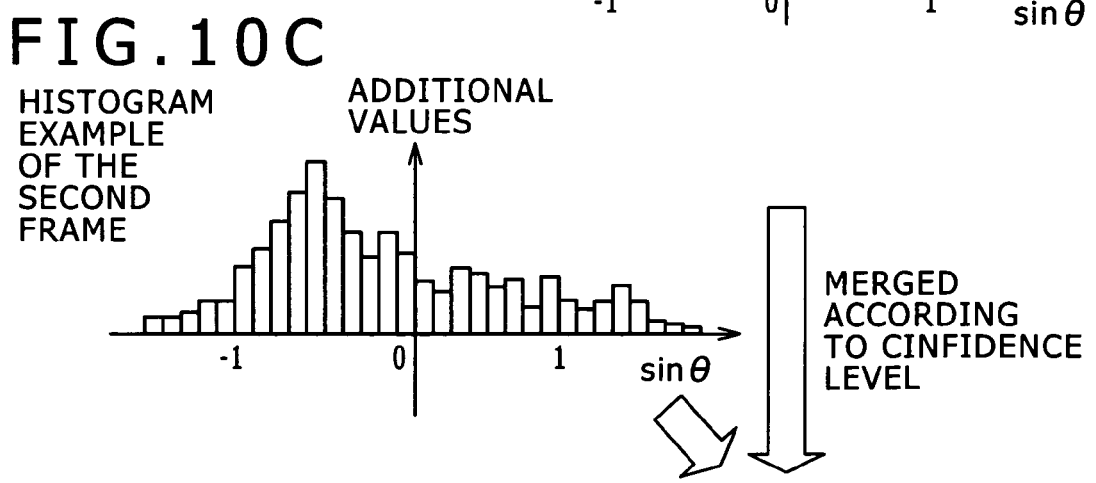
MERGED ACCORDING TO CINFIDENCE LEVEL
FIG. 10D HISTOGRAM EXAMPLE IN WHICH THE SMOOTHED FIRST FRAME IS ADDED TO THE SECOND FRAME
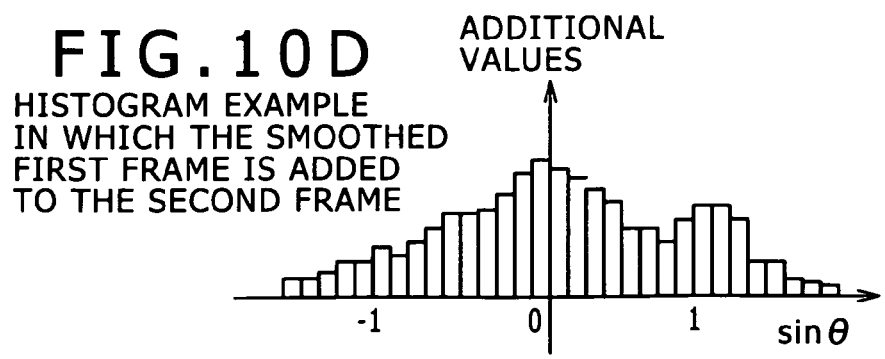

WHERE SOUND IS
DIRECTLY COLLECTED

WHERE REFLECTED
SOUND IS MIXED

EXAMPLE OF SOUND SOURCE DIRECTION

EXAMPLE OF THE SOUND SOURCE DIRECTIN OF A GIVEN FREQUENCY INDICATED ON A COMPLEX PLANE

HISTGRAM EXAMPLE

EXAMPLE OF THE EFFECTS OF NOISE INDICATED ON A COMPLEX PLANE

HISTGRAM EXAMPLE

SOUND SOURCE DIRECTION DETECTING APPARATUS, SOUND SOURCE DIRECTION DETECTING METHOD, AND SOUND SOURCE DIRECTION DETECTING CAMERA

CROSS-REFERENCES TO RELATED APPLICATIONS

The present application claims priority from Japanese Patent Application No. JP 2007-252734, filed in the Japanese Patent Office on Sep. 27, 2007, the entire content of which is incorporated herein by reference.

BACKGROUND OF THE INVENTION

1. Field of the Invention

The present invention relates to a sound source direction detecting apparatus, a sound source direction detecting method, and a sound source direction detecting camera for detecting the direction of a speaking person by analyzing the sound vocalized by that person illustratively during a conference.

2. Description of the Related Art

There exist video conferencing systems for linking speaking persons illustratively at remote locations during what is known as a video conference. With this type of system in operation, the remarks and gestures of the people participating in the video conference are exchanged in real time between the linked remote locations. One such video conferencing system is typically made up of microphones for collecting sounds emanating from the ongoing conference, a camera for imaging the participants, sound source detecting microphones incorporated in the camera so as to collect ambient sounds, and a sound source direction detection section for detecting the direction of the sound source (i.e., speaking person) based on the ambient sounds collected by the sound source detecting microphones. The video conference system also includes a drive part that points the camera in the speaking person's direction detected by the sound source direction detection section, and arrangements that convert the video frames imaged by the camera and the audio frames collected by the detecting microphones into a suitable transmission format before sending the converted data to another conference system set up in the opposite remote location.

The sound source direction detection section detects the direction of the speaking person relative to the camera by analyzing his or her voice. When the speaking person's direction is detected, the drive part points the camera to the speaking person accordingly and starts imaging that person. Diverse methods have been proposed and utilized for determining the speaking person's direction (called the sound source direction hereunder). Outlined below in reference to FIGS. 12A through 12C is how the sound source direction is usually determined using two microphones.

FIG. 12A shows how two microphones are positioned relative to the sound source. Two microphones are generally used to detect the sound source direction. A first microphone 101a is separated from a second microphone 102a by a distance D. When a perpendicular line is drawn to the midpoint of a line segment linking the first microphone 101a with the second microphone 102a, an angle $\theta$ is formed between the perpendicular on the one hand and the arrows 101b and 102b on the other hand. The arrows at the angle $\theta$ denote the direction of a sound source 100. It is assumed that the distance from the first microphone 101a or the second microphone 102a to the sound source 100 is sufficiently longer than the distance D between the first microphone 101a and the second microphone 102a. Thus the arrows 101b and 102b, indicating the direction of the sound coming from the sound source 100 and input to the first and the second microphones 101a and 102a, are considered parallel to each other.

In this case, there is a distance L between the first microphone 101a on the one hand, and an intersection point formed by a perpendicular drawn from the second microphone 102a to the arrow 101b and by the latter line segment on the other hand. The distance L corresponds to a difference in time between the two microphones when they receive sound waves coming from the sound source 100. In other words, dividing the distance L[m] by the sonic velocity [m/s] provides the difference between two points in time, i.e., between the time when a wave surface in phase with the sound wave generated by the sound source reaches the second microphone 102a, and the time when the wave surface reaches the first microphone 101a. The value of sin $\theta$ is then obtained from the distance D between the two microphones and from the distance L calculated from the time difference. With the value of sin $\theta$ calculated, the camera is pointed in the sound source direction A accordingly.

FIG. 12B shows on a complex plane the sounds detected by the first and the second microphones 101a and 102a. As indicated in FIG. 12B, there is a phase difference $\phi$ between two vectors: vector B representing the sound detected by the first microphone 101a, and vector C denoting the sound detected by the second microphone 102a. The phase difference $\phi$ is attributable to the fact that the distance between the first microphone 101a and the sound source 100 is different from the distance between the second microphone 102a and the sound source 100 while the sound waves come from the same sound source. Taking the effects of the phase difference $\phi$ into consideration makes it possible to acquire the difference between two points in time, i.e., between the times when sound waves of a given frequency component reach the first microphone 101a and when sound waves of the same frequency component reach the second microphone 102a. The time difference thus obtained in turn allows the value of sin $\theta$ to be calculated, whereby the sound source direction is detected.

Sounds are first collected at intervals of a predetermined unit time and decomposed illustratively through fast Fourier transform (FFT) into frequency components making up the vectors for estimating the sound source direction. The phase difference $\phi$ between the first microphone 101a and the second microphone 102a is thus obtained. The lengths of the vectors found on the complex plane denote the sound power levels of the frequency components involved. Ideally, the sound source direction detected by the first microphone 101a should coincide with the sound source direction detected by the second microphone 102a, the direction being that of the vector B shown in FIG. 12B. Illustratively, the phase difference is zero if the sound source is located in the front (i.e., when the distance from the first microphone 101a to the sound source 100 is equal to the distance from the second microphone 102a to the sound source 100). A phase difference occurs if the sound source is located diagonally in front (i.e., when the distance from the first microphone 101a to the sound source 100 is different from the distance from the second microphone 102a to the sound source 100). That is, a plurality of vectors on the complex plane reveal the existence of a phase difference.

FIG. 12C shows a typical histogram acquired through analysis in ±90-degree directions relative to the front facing the first and the second microphones 101a and 102a (i.e., the direction of a perpendicular to the line segment linking the first microphone 101a with the second microphone 102a). In the histogram of FIG. 12C, the horizontal axis stands for values of sin θ and the vertical axis for additional power levels. Because the human voice contains various frequencies, power levels are calculated for each of the frequencies involved. At each of the angles involved, the acquired power level is added to the histogram. The results point to the angle of the sound source direction.

The values of sin θ include |sin θ|>1 for the reasons to be explained herein. It is obvious that |sin θ|≦1 is included. Ordinarily, the following expression (1) is used to find the value of sin θ:

$$\sin\theta = \frac{\text{time difference of } 1/f \times \varphi/2\pi \times \text{sound velocity}}{\text{distance between microphones}} \quad (1)$$

where, f[Hz] stands for the frequency and φ for the phase difference.

If the value of sin θ is determined on the basis of time difference, sonic velocity, and distance between microphones and if the second microphone 102a is reached by sound waves earlier than the first microphone 101a, then the time difference takes on a positive value. If the second microphone 102a is reached by sound waves later than the first microphone 101a, then the time difference becomes a negative value. Thus the value of sin θ can be positive or negative. If in the expression (1) above the numerator is larger than the denominator, then the value of sin θ can be smaller than −1 or larger than 1. The values that occur when |sin θ|>1 stem from errors or sound wave diffraction. For these reasons, histograms displayed when |sin θ|>1 need also be taken into consideration.

Where sound is collected by a plurality of microphones, the estimated angle for each of the frequencies involved is added to the histogram as described. The angle at which the power level is highest is then detected as the sound source direction.

Japanese Patent Laid-Open No. Hei 7-336790 discloses a microphone system that collects a plurality of sound signals and finds a time lag therebetween as well as the highest power level of the collected signals. The time lag and the highest power level are used to switch from one sound signal to another in collecting the sound.

Japanese Patent Laid-Open No. 2004-12151 discloses a sound source direction estimating apparatus with arrangements for preventing degradation of the accuracy in estimating where the sound source is located amid reflected sounds and noises which have been input concurrently.

Japanese Patent Laid-Open No. 2006-194700 discloses techniques for minimizing those errors in the sound source direction which are attributable to reverberations.

SUMMARY OF THE INVENTION

When implemented, the techniques proposed so far could lead to inaccurate detection of where the speaking person is located. The primary reason for the wrong detection of the sound source direction is considered to be the effects of noise components that occur around the sound source 100. The effects of the noise generated around the sound source 100 are discussed below in reference to FIGS. 13A and 13B.

FIG. 13A is a schematic view explanatory of the effects of the noise concomitant with a sound. As shown in FIG. 13A, the noise has a certain level of power (N), and noise components rotate at predetermined intervals on a complex plane. The sound having a power level P higher than that of the noise is decomposed into frequency components which in turn are used to find the sound source direction. At this point, the direction deviating from the correct sound source direction by a maximum amount of N is detected as an apparent—and incorrect—sound source direction. When that apparent sound source direction is detected, there is created a deformed histogram indicative of frequency components supplemented with additional power levels within a predetermined frequency range.

FIG. 13B is a typical histogram representation in which each of the frequency components involved is supplemented with an additional power level. In this example, an additional value 111 giving the largest histogram value indicates that the value of sin θ is in a "−0.6" direction. In reality, however, the correct sound source direction A is the direction of an additional value 110 (sin θ=0.3) shown in FIG. 12C. That is, a power level can be added in a false direction on a certain frequency range, with the result that the camera in operation can be deviated from the speaking person.

The embodiments of the present invention have been made in view of the above circumstances and provide arrangements such that the direction of the sound source (i.e., speaking person) is detected unfailingly.

In carrying out the present invention and according to one embodiment thereof, there is provided a sound source direction detecting method including the steps of: decomposing an audio frame formed by a plurality of microphones collecting sounds from a sound source, into frequency components at intervals of a predetermined unit time; determining as an error range the effects of noises occurring around the sound source; dispersing power levels determined for the frequency components decomposed in the frequency decomposing step on the basis of the error range determined in the error range determining step; adding the dispersed power levels; and detecting the phase at which is located the highest of the added power levels as the direction of the sound source.

According to another embodiment of the present invention, there is provided a sound source direction detecting method including the steps of: decomposing an audio frame formed by a plurality of microphones collecting sounds from a sound source, into frequency components at intervals of a predetermined unit time; adding power levels determined for each of the decomposed frequency components; detecting the direction of the sound source based on the phase at which the highest of the added power levels is located; smoothing the added power levels; storing the smoothed power levels; and adding the smoothed power levels derived from the first audio frame, to the power levels determined for each of the frequency components in a second audio frame formed by the plurality of microphones collecting the sounds continuing from the first audio frame.

Where the embodiments of the present invention are embodied and implemented as outlined above, the direction of a sound source (i.e., speaking person) is detected reliably despite the noises occurring around that source.

Furthermore, by using consecutive audio frames, it is possible to detect the direction of the speaking person more reliably than before.

According to the embodiments of the present invention outlined above, the direction of the sound source (speaking person) is reliably detected, so that the camera in operation may be oriented in the detected direction accordingly. The camera is prevented from pointing in a direction not aligned with the direction of the speaking person.

When the direction of the speaking person is detected reliably from continuous audio frames, the camera is oriented in the correctly detected direction. This arrangement further prevents the camera from pointing in the wrong direction.

BRIEF DESCRIPTION OF THE DRAWINGS

Further aims and advantages of the embodiments of the present invention will become apparent upon a reading of the following description and appended drawings in which:

FIGS. 8A and 8B are graphic representations explanatory of typical histograms ordinarily calculated and displayed per frame;

FIGS. 10A through 10D are graphic representations explanatory of typical histograms displayed by the second embodiment;

DETAILED DESCRIPTION OF THE PREFERRED EMBODIMENTS

The first preferred embodiment of the present invention is described below in reference to FIGS. 1 through FIG. 6B. The first embodiment is practiced illustratively as a video conferencing system 10 capable of sending and receiving images and sounds in real time between remote locations.

Figure 1:
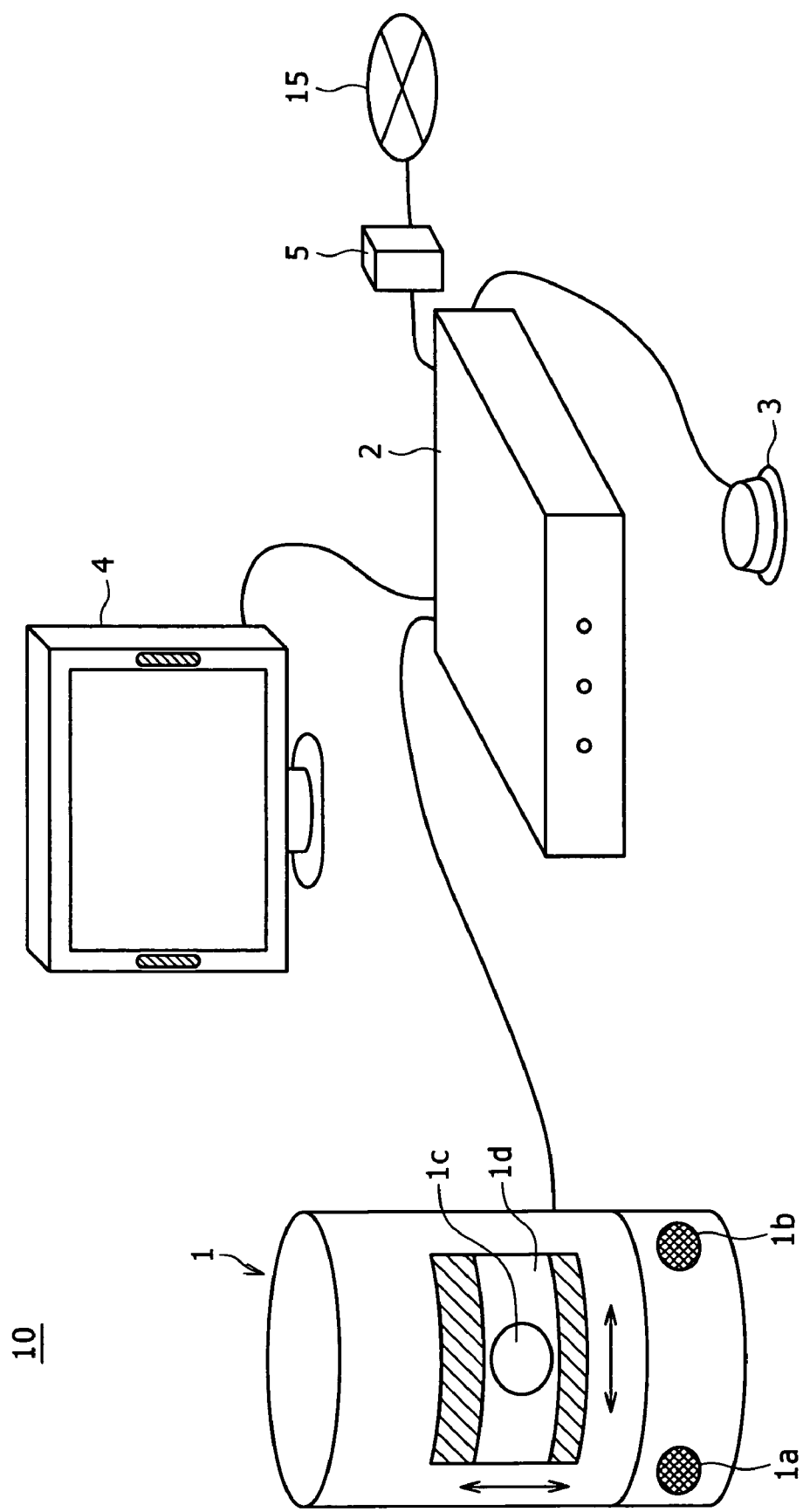
FIG. 1 is an external view showing how a video conferencing system is configured as a first embodiment of the present invention.

FIG. 1 is an external view showing how the video conferencing system 10 of the first embodiment is typically configured. A camera 1 for imaging the speaking person contains, in the bottom portion of its enclosure, a first microphone 1a and a second microphone 1b for collecting sounds in order to detect their source. The first and the second microphones 1a and 1b are a predetermined distance apart (e.g., about 10 centimeters). The first and the second microphones 1a and 1b convert the collected sounds into an audio frame that is sent to a control device 2. The sounds collected by the first and the second microphones 1a and 1b are not used to record the speaking person's remarks but utilized solely for detecting the sound source. The enclosure of the camera is fixedly installed so that the first and the second microphones 1a and 1b are immobile in their orientation.

The camera 1 is furnished with a drive part 1d capable of panning and tilting. The drive part 1d includes a lens part 1c for imaging the speaking person. The lens part 1c contains a zoom control mechanism and a focus control mechanism, not shown. When the video conferencing system 10 detects the direction of the speaking person, the drive part 1d points the lens part 1c toward the speaking person and adjusts the angle of that part. The drive part 1d recognizes the speaking person's face by analyzing the images taken by the lens part 1c, and performs zoom control so as to place the person's face in the middle of the screen.

The camera 1 is connected to the control device 2 that controls various components of the system. In operation, the camera 1 converts captured optical images into electrical signals constituting video frames that are sent to the control device 2. A nondirectional microphone 3 capable of collecting sounds in all directions collects audio frames and sends them to the control device 2. The control device 2 is connected to a display device 4 which incorporates speakers for outputting sounds and which is equipped with a liquid crystal display for displaying images. The display device 4 displays a view of the opposite party's conference room at a remote location and outputs each speaking person's remarks through the speakers.

The control device 2 compresses the video frames acquired by the camera 1 and the audio frames obtained by the nondirectional microphone 3 according to the MPEG-4 (Moving Picture Experts Group Phase 4) standard, and divides the compressed frames into UDP (User Datagram Protocol) packets. The packets prior to their transmission are encrypted for secure communication. The encryption is done illustratively using AES (Advanced Encryption Standard), a version of symmetric key cryptography. SDP (Session Description Protocol) or RTP (Real-time Transport Protocol) is typically used as the transmission protocol for implementing a real time communication setup. The control device 2 sends the packets in multicast fashion to the opposite party through a router 5. Data is sent and received between the locations involved over a network such as the Internet.

Upon receipt of the packets from the opposite party, the control device 2 causes the display device 4 to display an image of the opposite party and to output their voices. Also, the display device 4 may divide its screen into a plurality of parts to display speaking persons 11a through 11d concurrently. In this manner, a conference can be held by the parties involved at remote locations with the virtual annihilation of distance therebetween.

Figure 2:
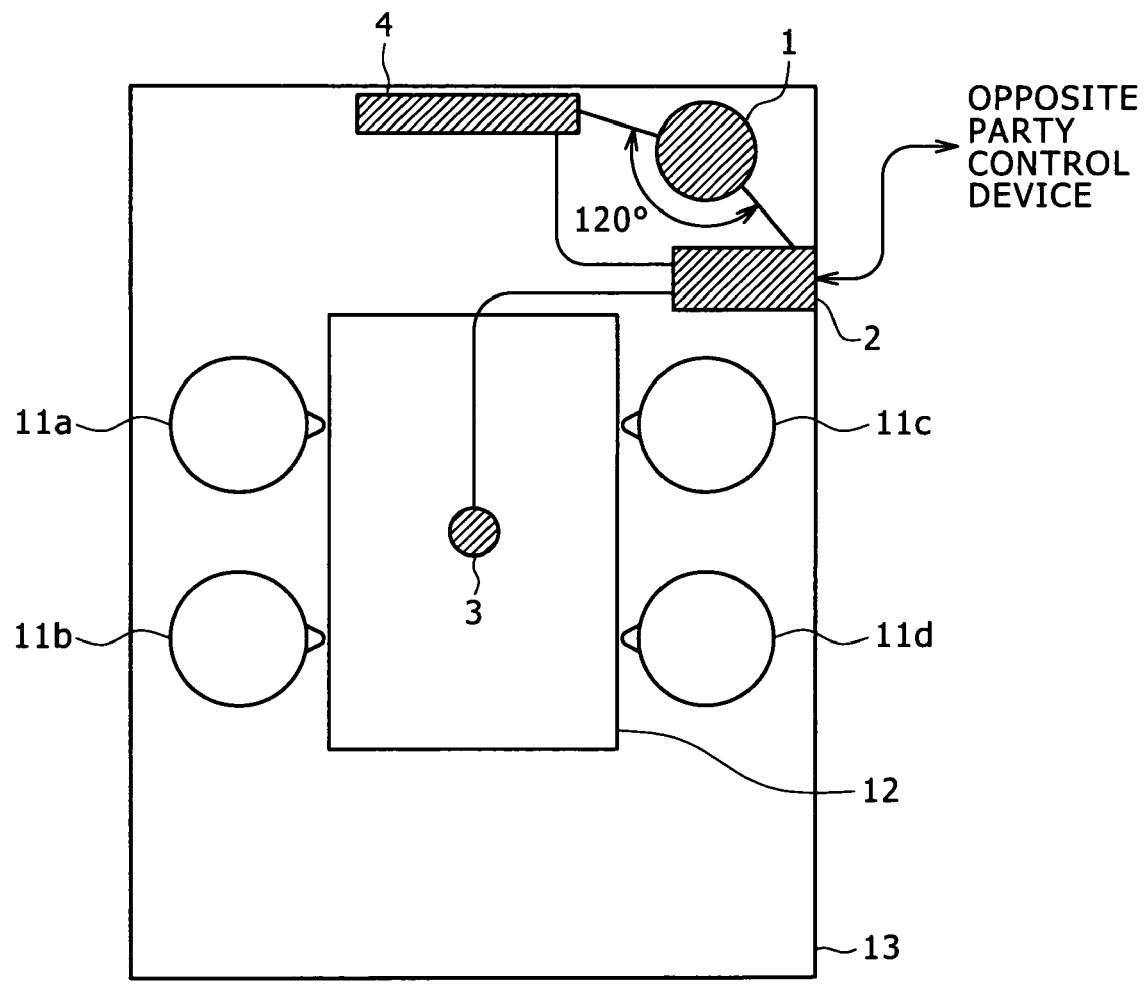
FIG. 2 is a schematic view showing how the video conferencing system as the first embodiment is typically set up.

A typical setup of the video conferencing system 10 is explained below in reference to FIG. 2. FIG. 2 gives a bird's eye view of a conference room 13. In the middle of the conference room 13 is a table 12 on which the nondirectional microphone 3 is placed. Four persons 11a through 11d sit around the table 12, two on each of the opposing sides for the conference. The display device 4 is placed near one wall of the room, in such a manner that it will not obstruct the sight of the camera 1 and can be viewed by each of the persons 11a through 11d in the room 13. In operation, the display device 4 displays images of the opposite party being connected and outputs their voices.

The camera 1 for imaging the persons 11a through 11d is set up in one corner of the conference room 13. When one of the persons starts speaking, the camera 1 detects the direction of the speaking person and images that person through pan, tilt, and zoom operations. The camera 1 can suitably image each speaking person within a panning range of about 120 degrees.

Figure 3:
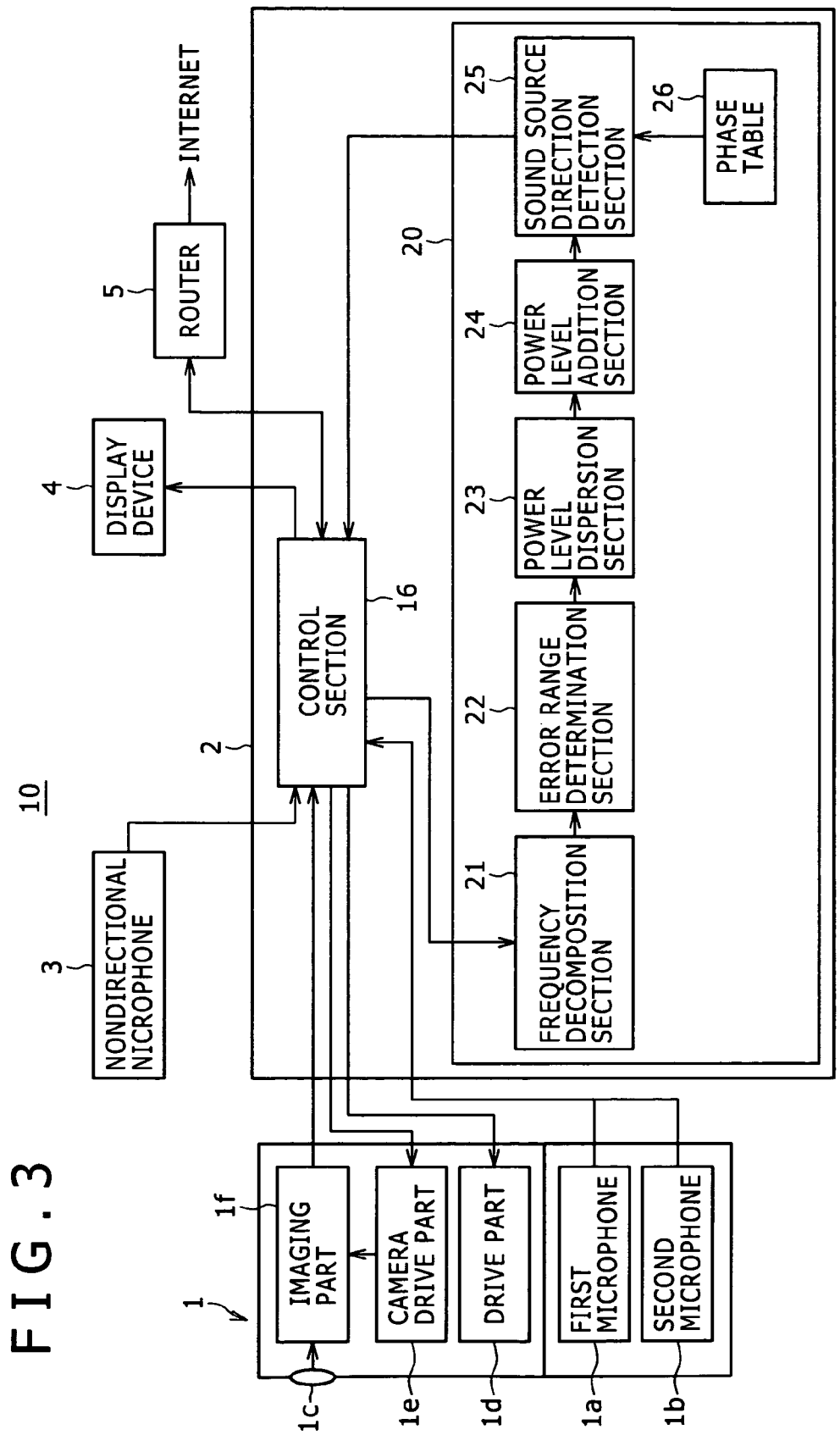
FIG. 3 is a block diagram showing a typical internal structure of the video conferencing system as the first embodiment.

A typical internal structure of the video conference system 10 is described below in reference to FIG. 3. The camera 1 is furnished with the lens part 1c. Image light is input through the lens part 1c to form an image on the imaging area of a CCD (charge coupled device) imaging part 1f. A camera drive part 1e for controlling the lens part 1c in zoom and focus operations drives the lens part 1c using control signals supplied by the control device 2. An analog video signal obtained by the camera 1 through imaging is fed to a control section 16 which is incorporated in the control device 2 and which controls other component sections. The control section 16 converts video frames in analog form into video frames in digital form through a suitable digitalizing process.

The audio frames of the analog signal collected by the first and the second microphones 1a and 1b are also supplied to the control section 16. In turn, the control section 16 converts the audio frames in analog form into audio frames in digital form through an appropriate digitalizing process.

The control device 2 is equipped with a sound source direction detecting apparatus 20 for detecting the direction of a sound source. The sound source direction detecting apparatus 20 includes: a frequency decomposition section 21 for decomposing the digital audio signal supplied by the control section 16 into a plurality of frequencies; an error range determination section 22 for determining an error range applicable to noises; a power level dispersion section 23 for dispersing power levels for each of the frequencies based on the determined error range; a power level addition section 24 for adding dispersed power level distributions (of power level values); and a sound source direction detection section 25 for detecting the sound source direction on the basis of the power level distributions added within a predetermined frequency range.

The frequency decomposition section 21 extracts a plurality of frequency components from the digital audio signal. The frequency values of the frequency components to be extracted fall within the audible range of, say, 200 Hz through 4 kHz. The resolution of frequency components varies depending on the FFT settings. The error range determination section 22 determines the range of phase errors attributable to the noises occurring around the sound source. Illustratively, such noises stem from an air conditioner. Given the phase error range thus determined, the power level dispersion section 23 disperses power levels over the error range. The power level addition section 24 adds up dispersed power levels. The power levels thus added are indicated illustratively in the histograms of FIGS. 5A and 5B, to be discussed later.

Based on the power levels added by the power level addition section 24, the sound source direction detection section 25 detects the sound source direction by finding out the phase at which the highest of the added power levels is located. At this point, the sound source direction detection section 25 references a phase table 26 which lists phase differences $\phi$ in association with phases $\theta$. The sound source direction detection section 25 detects the value of sin $\theta$ from the time difference determined by the phase difference $\phi$ in effect. The detected value of sin $\theta$ is then sent from the sound source direction detection section 25 to the control section 16. Given the value of sin $\theta$ from the sound source direction detection section 25, the control section 16 causes the drive part 1d to point the lens part 1c in the speaking person's direction.

Figure 4:
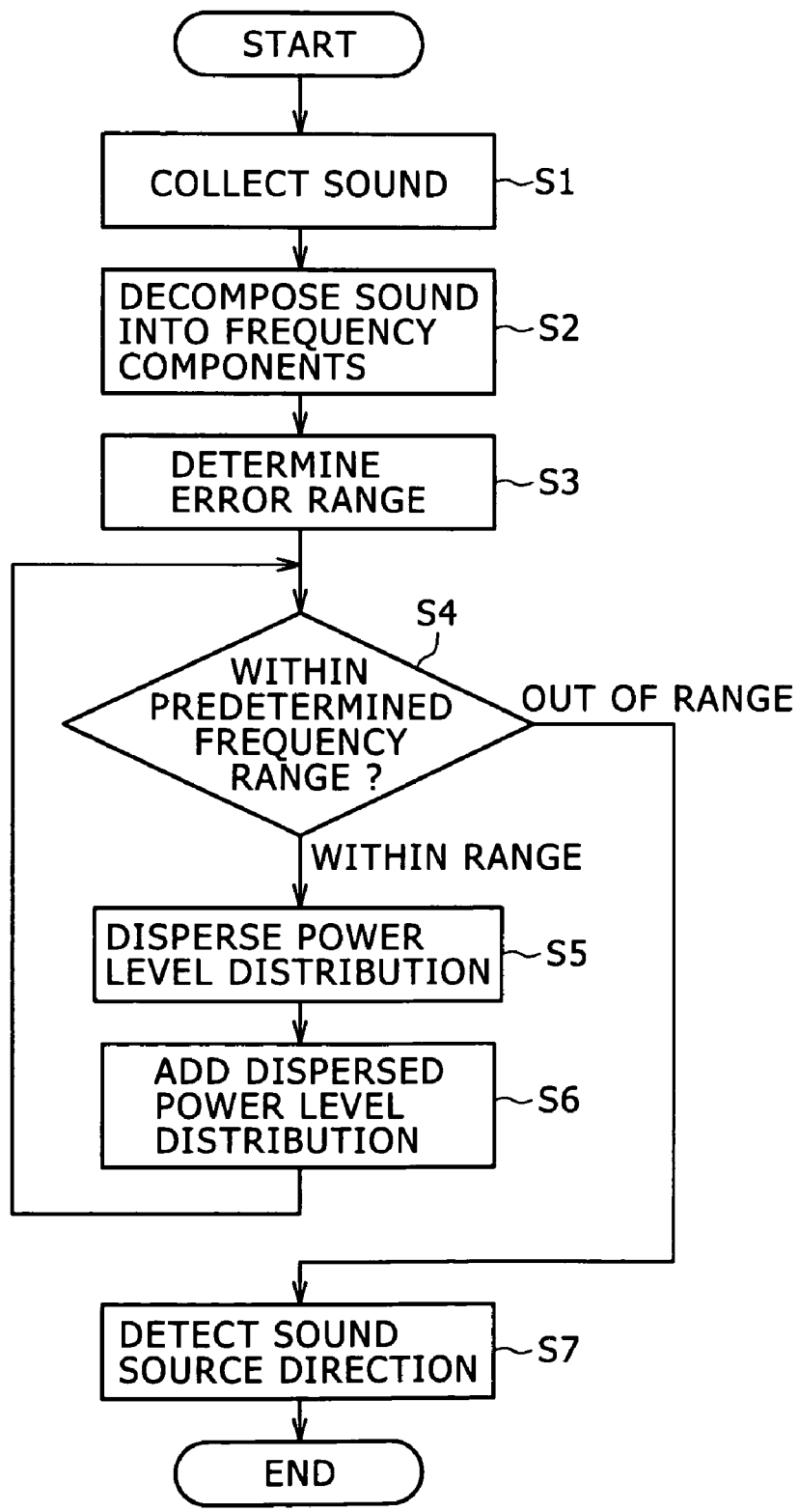
FIG. 4 is a flowchart of steps constituting a sound source direction detecting process performed by the first embodiment.

A typical process for estimating the sound source direction is explained below in reference to FIG. 4. In step S1 of FIG. 4, the first and the second microphones 1a and 1b collect sounds from the sound source, form the collected sounds into an audio frame, and send the audio frame to the control device 2. The audio frame received by the control device 2 is converted to a digital signal that is forwarded to the frequency decomposition section 21.

In step S2, the frequency decomposition section 21 decomposes the audio frame into a plurality of frequency components. At this point, the frequency decomposition section 21 decomposes the sounds into frequency components by subjecting the audio frame to fast Fourier transform.

In step S3, the error range determination section 22 determines the range of errors attributable to noises. The determined sound source direction might be deviated under the influence of noises. This bottleneck is circumvented by dispersing power levels in a normal distribution within the error range. This makes it possible to minimize the adverse effects of the deviated sound source direction on the added power levels.

In step S4, the power level addition section 24 checks to determine whether a given frequency component falls within a predetermined frequency range. Illustratively, a check is made to see if the frequency component of interest is included within the range of 200 Hz through 4 kHz. The frequency value is initially set for 200 Hz and incremented thereafter in units of several tens of Hz, and the power level acquired in each frequency range is added up.

If the frequency component is found to fall within the predetermined frequency range, then the power level dispersion section 23 goes to step S5 and disperses power levels in a normal distribution within the predetermined error range. In step S6, the power level addition section 41 adds up the power level distribution dispersed by the power level dispersion section 23. Control is then returned to step S4, another frequency component is checked, and the dispersed power level distribution derived from the new frequency component is added.

When all power level distributions dispersed within the predetermined frequency range have been added, step S7 is reached. In step S7, the sound source direction detection section 25 finds the phase from the value of sin $\theta$ at which the highest of the added power levels is located and detects the sound source direction from the phase thus acquired.

Figure 5A:
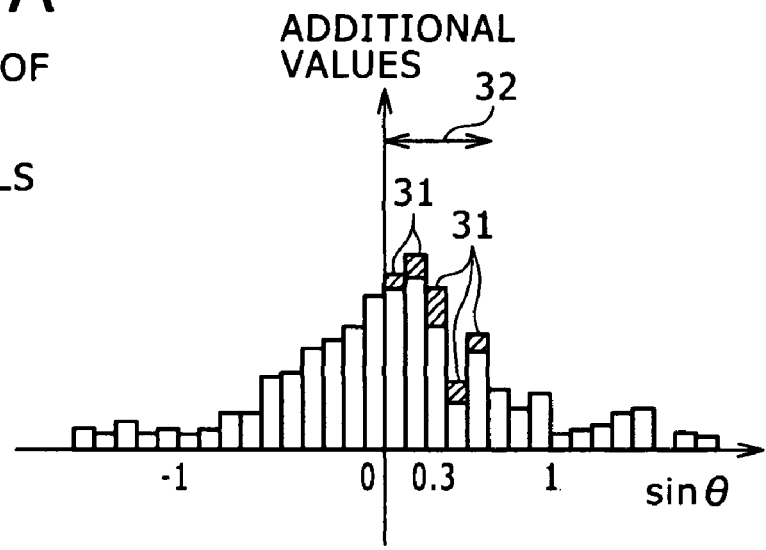
FIGS. 5A and 5B are graphic representations explanatory of typical histograms displayed by the first embodiment.

Typical histograms displayed by the process described in reference to FIG. 4 will now be explained by referring to FIGS. 5A and 5B. FIG. 5A is a graphic representation showing a histogram obtained by adding power level distributions at certain frequencies. The collected sounds are decomposed into a plurality of frequency components. The power levels determined for each of the frequency components are dispersed in a normal distribution within an error range 32. As a result, the highest of the dispersed power levels is added to the estimated value of sin $\theta$=0.3. In this example, the dispersed power levels are added to five values of sin $\theta$ centering on sin $\theta$=0.3.

Figure 5B:
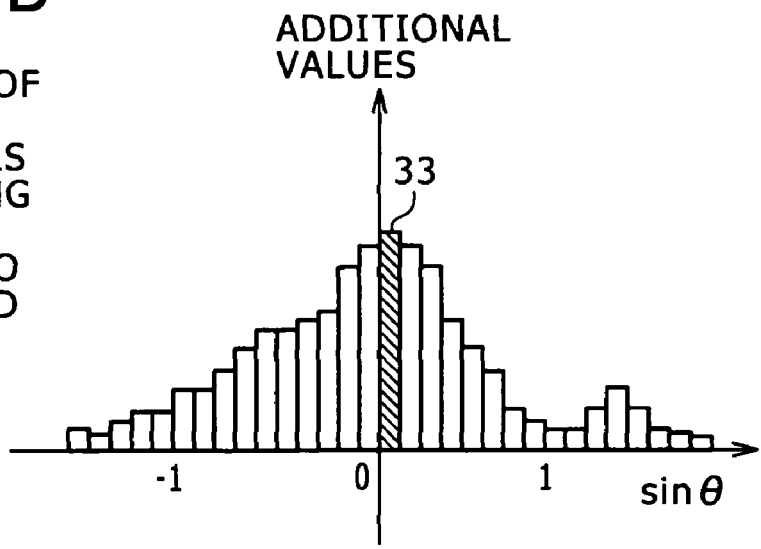

FIG. 5B is a graphic representation showing a histogram acquired by adding dispersed power level distributions within a predetermined frequency range. The sound source direction detection section 25 regards the value of sin $\theta$ with the highest additional power level as representative of an estimated direction 33 in which the sound source would presumably be located. This makes it possible correctly to detect the sound source direction that used to be estimated erroneously, as illustrated in FIG. 5B.

Typical histograms displayed when sounds of high frequencies are added are explained below in reference to FIGS. 6A and 6B. Because the location of sin $\theta$ varies with the frequency except for the correct candidate of the sound source direction, the accurate sound source direction may be selected by adding up histograms. In the past, there were cases in which a completely different direction was estimated incorrectly as the sound source direction where high frequencies were involved. By contrast, the sound source direction detecting apparatus 20 of this embodiment is capable of correctly detecting the sound source direction even at high frequencies. What follows is a description of how the correct detection of the sound source direction is made possible by the first embodiment.

Figure 6A:
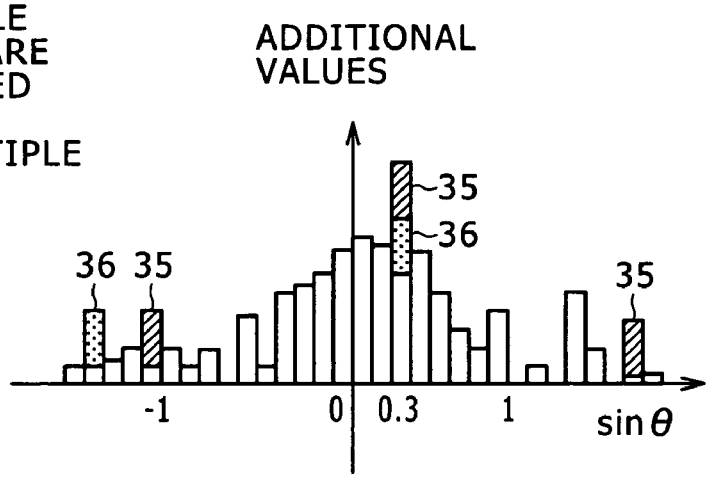
FIGS. 6A and 6B are graphic representations explanatory of typical histograms with minimal effects of phases in the high frequency range with regard to the first embodiment.

FIG. 6A is a graphic representation of a common histogram supplemented with sound power levels at high frequencies. It is assumed that the correct direction of the sound source is at sin θ=0.3. From FIG. 6A, it can be seen that a power level 35 obtained from 3 kHz sound waves and a power level 36 acquired from 4 kHz sound waves are dispersed and added in diverse directions other than the direction at sin θ=0.3. This is because there exist a plurality of θ candidates at high frequencies where sin θ__0=f (φ, frequency) and sin θ__1=f (φ+2 π, frequency). The effects of the added values in the other directions can thus lead to the erroneous detection of the sound source.

When power levels are dispersed before being added as discussed above, the detected direction of the sound source becomes more or less correct even at low frequencies. Histograms are thus added starting from a low frequency. If a plurality of candidates are found to exist at a high frequency, the values to be added at that point are altered.

Figure 6B:
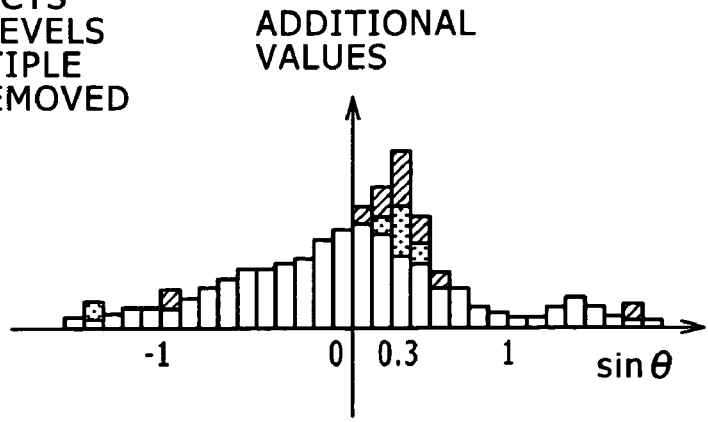

FIG. 6B shows a typical histogram to which sound power levels are added at high frequencies by the sound source direction detecting apparatus 20 of the first embodiment. From FIG. 6B, too, it can be seen that the power level 35 obtained from 3 kHz sound waves and the power level 36 acquired from 4 kHz sound waves are dispersed and added in diverse directions. The difference from the preceding example is that the value to be added is weighted to become larger the higher the frequency component is. If sin θ__1 represents the power level to be added by the first microphone 1a for frequencies up to 3 kHz and if sin θ__2 denotes the power level to be added by the second microphone 1b for frequencies also up to 3 kHz, then the following expressions (2) and (3) are used to find the power levels to be added:

$$\text{Sin}\theta\_1 = \frac{hist(\sin\theta\_1)}{hist_{(-3khz)}(\sin\theta\_1) + hist_{(-3khz)}(\sin\theta\_2)} \times (P-N) \quad (2)$$

$$\text{Sin}\theta\_2 = \frac{hist(\sin\theta\_2)}{hist_{(-3khz)}(\sin\theta\_1) + hist_{(-3khz)}(\sin\theta\_2)} \times (P-N) \quad (3)$$

The power levels to be added are thus weighted in accordance with the value of sin θ, and the correct direction of the sound source is detected accordingly.

According to the sound source direction detecting apparatus 20 of the first embodiment described above, it is possible to detect the correct direction of the sound source by minimizing the adverse effects of the noises collected by the microphones together with the target sounds. The accurate detection of the sound source direction allows the currently speaking person to be imaged correctly.

In the foregoing description, the sound source direction detecting apparatus 20 was shown furnished with the error range determination section 22 for determining, as the error range, the effects of the noise included in the sounds in unit time. Alternatively, the error range, once determined, may be stored in a suitable memory arrangement for a predetermined time period (e.g., for 3 seconds). In this case, control is transferred from the frequency decomposition section 21 to the power level dispersion section 23. The alternative process permits suitable calculation of the error range because the effects of the noise remain unchanged for an extended period of time. An additional benefit is that the speed of processing is boosted because there is one less processing step to be performed.

Figure 7:
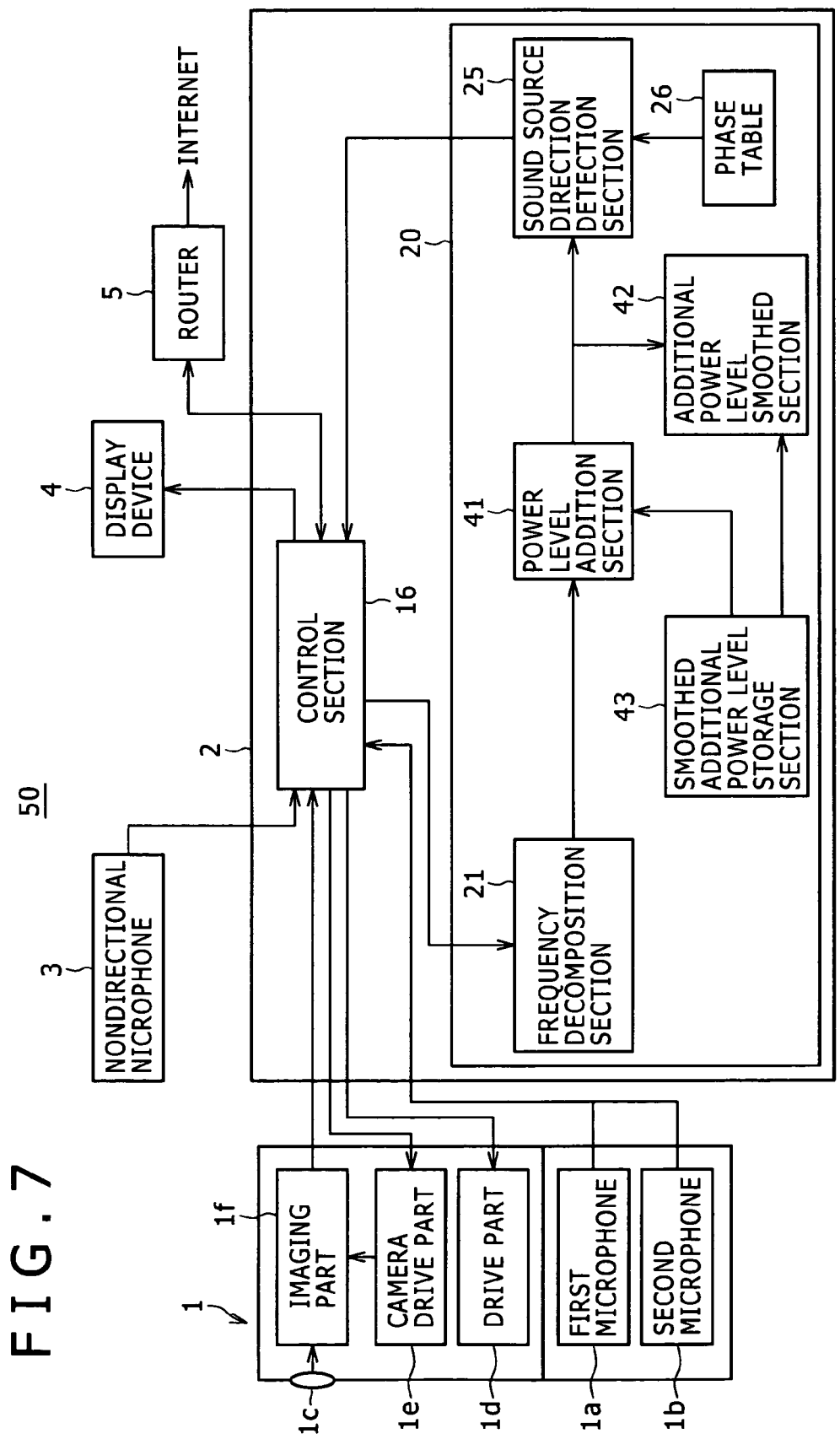
FIG. 7 is a block diagram showing a typical internal structure of a video conferencing system practiced as a second embodiment of the present invention.

Described below in reference to FIG. 7 is a typical internal structure of a sound source direction detecting apparatus 40 practiced as the second embodiment of the present invention. A video conference system 50 including the sound source direction detecting apparatus 40 is configured and set up in the same manner as the video conferencing system 10 of the above-described first embodiment and thus will not be described further in detail. Of the reference numerals in FIG. 7, those already used in FIG. 3 in connection with the first embodiment designate like or corresponding parts.

The sound source direction detecting apparatus 40 includes: a frequency decomposition section 21 for decomposing a digital audio signal into a plurality of frequencies; a power level addition section 41 for adding dispersed power levels; and a sound source direction detection section 25 for detecting the direction of a sound source based on the additional values of added power level distributions. The sound source direction detecting apparatus 40 further includes: an additional power level smoothing section 42 for smoothing, using a predetermined formula, the values added by the power level addition section 41 per audio frame (or simply called the frame hereunder); and a smoothed additional power level storage section 43 for storing the values of smoothed additional power levels. The power level addition section 41 adds the smoothed additional values retrieved from the smoothed additional power level storage section 43, to the additional power levels of the decomposed frequency components. The power levels thus added are shown in one of the histograms of FIGS. 10A through 10D, to be discussed later.

On the basis of the power levels added by the power level addition section 41, the sound source direction detection section 25 regards as the sound source direction the phase at which is located the highest of the added power levels. At this point, the sound source direction detection section 25 references the phase table 26 which lists phase differences φ in association with sin θ. The sound source direction detection section 25 detects the value of sin θ from the time difference determined by the phase difference φ in effect. The detected value of sin θ is then sent from the sound source direction detection section 25 to the control section 16. Given the value of sin θ from the sound source direction detection section 25, the control section 16 causes the drive part 1d to point the lens part 1c in the speaking person's direction.

Described below in reference to FIGS. 8A and 8B are histograms displayed on the basis of those frames of the same frequency component which are acquired continuously over time (i.e., a first frame and a second frame). FIG. 8A shows a typical histogram of the first frame, and FIG. 8B indicates a typical histogram of the second frame. In the past, the sounds collected in a predetermined unit time were decomposed into frequency components per frame, and were supplemented with power levels per frame. In other words, the added power levels to the first frame were reset, before power levels were again added to the second frame. In such cases, even where the frames were chronologically continuous, histograms could be different from one frame to another and the estimated direction of the sound source could be dispersed correspondingly. This bottleneck is circumvented by the arrangements of this embodiment.

Figure 9:
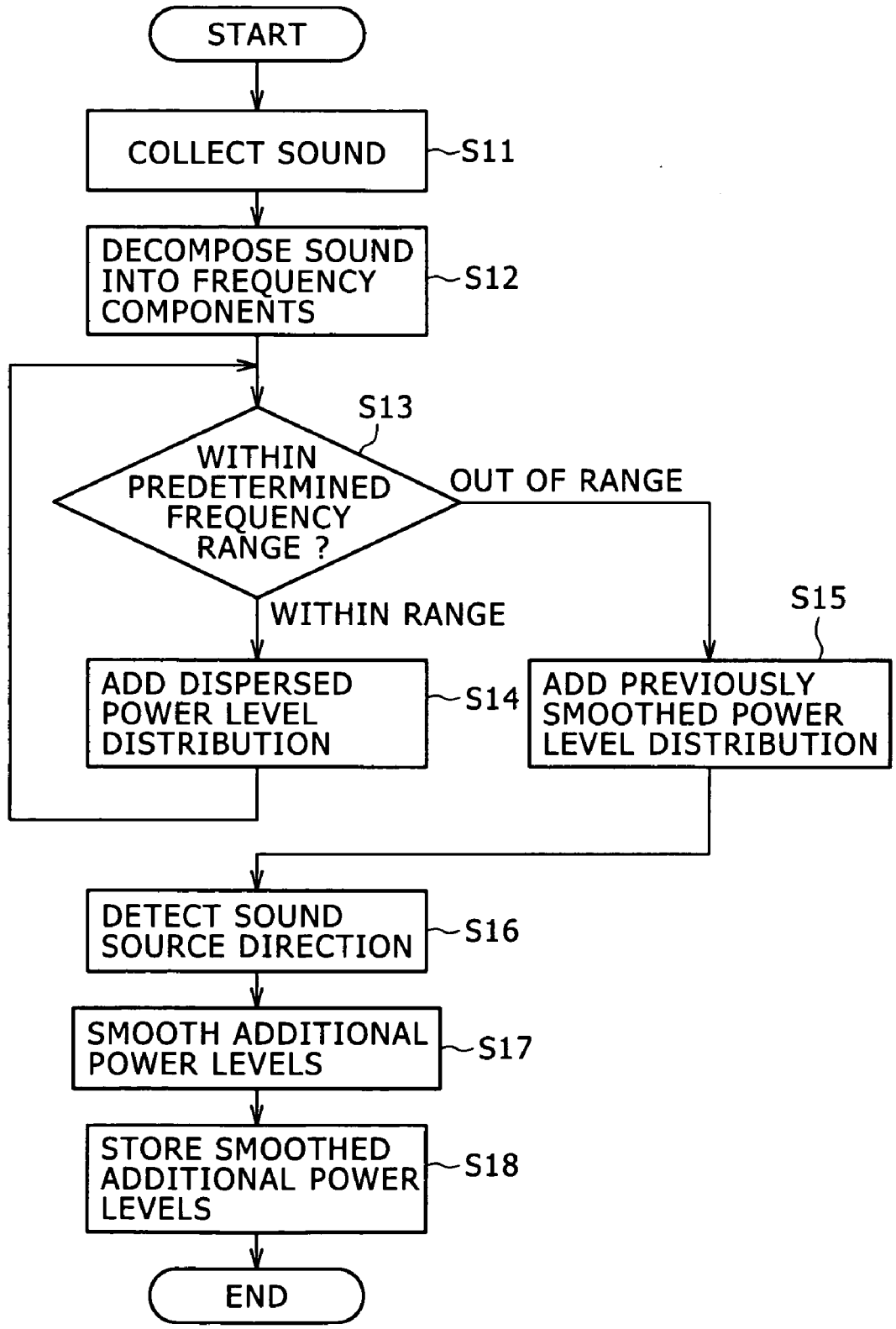
FIG. 9 is a flowchart of steps constituting a sound source direction detecting process performed by the second embodiment.

Described below in reference to FIG. 9 is a typical process performed by the sound source direction detecting apparatus 40 of the second embodiment for estimating the direction of a sound source. The sound source direction detecting apparatus 40 obtains additional power levels for each of the chronologically continuous audio frames (e.g., the first and the second frames in the ensuing description) and adds up the power levels thus acquired. The process makes it possible to leave unchanged the effects of the sound source direction detected from the first frame, before proceeding to detect the sound source direction from the second frame with the remaining effects taken into account.

In step S1 of FIG. 9, the first and the second microphones 1a and 1b collect sounds, form the collected sounds into an audio frame, and send the audio frame to the control device 2. The audio frame (i.e., first frame) received by the control device 2 is converted to a digital signal that is forwarded to the frequency decomposition section 21.

In step S12, the frequency decomposition section 21 decomposes the audio frame into a plurality of frequency components. At this point, the frequency decomposition section 21 decomposes the sounds into frequency components by subjecting the audio frame to fast Fourier transform.

In step S13, the power level addition section 24 checks to determine whether a given frequency component falls within a predetermined frequency range. Illustratively, a check is made to see if the frequency component of interest is included within the range of 200 Hz through 4 kHz. The frequency value is initially set for 200 Hz and incremented thereafter in units of several tens of Hz, and the power level acquired in each frequency range is added up.

If the frequency component is found to fall within the predetermined frequency range, then step S14 is reached. In step S14, the power level addition section 41 adds up the power level distribution derived from the frequency component. Control is then returned to step S13, another frequency component is checked, and the power level distribution obtained from the new frequency component is added.

In step S15, the power level addition section 41 adds the smoothed power levels of the first frame following their retrieval from the smoothed additional power level storage section 43, to the power levels which are created by the multiple microphones collecting the sounds continuing from the first frame, in a manner determined for each of the frequency components of the current second frame.

When all power level distributions dispersed within the predetermined frequency range have been added, step S16 is reached. In step S16, the sound source direction detection section 25 finds the phase from the value of sin θ at which the highest of the added power levels is located and detects the sound source direction from the phase thus obtained. In step S17, the additional power level smoothing section 42 smoothes the power level distribution for each phase using a predetermined formula. This step forms a distorted histogram into a smoothed shape.

In step S18, the smoothed additional power level storage section 43 stores the values of the power level distribution determined with regard to the smoothed frames. The values of the power level distribution determined for the smoothed frames are added up in step S15.

Described below in reference to FIGS. 10A through 10D are typical histograms supplemented with the power level distributions determined by the sound source direction detecting apparatus 40 of the second embodiment with regard to the first and the second frames. FIG. 10A shows a typical histogram of the first frame. Different histograms are displayed over time from one frame to another even at the same frequency component. It is assumed here that a function hist (1, x) represents the additional values at sin θ=x for the first frame.

FIG. 10B shows a typical histogram of the first frame smoothed in the spatial direction (sin θ). The additional power level smoothing section 42 smoothes the added power levels to the histogram of FIG. 10A using the following expression (4):

hist_smooth(1, x)=0.25×hist(1, x1)+0.5×hist(1, x)+0.25×hist(1, x+1)   (4)

where, hist_smooth(1, x) is the function representing the smoothed power level distribution.

FIG. 10C shows a typical histogram of the second frame. For the second frame, the added values at sin θ=x are represented by a function hist_add(2, x). The second frame is created from the sounds collected subsequent to the first frame. The first and the second frames are audio frames that are created in a chronologically continuous manner. It should be noted that the first and the second frames may or may not partially overlap chronologically with one another.

FIG. 10D shows a typical histogram obtained by adding the histogram of the first frame to that of the second frame. In this case, the functions hist_smooth(1, x) and hist_add(2, x) are added, each function being weighted by a confidence coefficient "c" ($0 \leq c \leq 1$) in order to increase the accuracy of the sound source direction by use of the following expression (5):

confidence coefficient: c(0 to 1) hist(1, x)=c×hist_add(1, x)+(1−c)×hist_smooth(0, x)   (5)

As a result, a smoothed histogram representative of the second frame is acquired. The confidence coefficient "c" is a value indicating how much confidence can be had in the frame of interest compared with previous histograms. That is, the higher the confidence coefficient "c," the more likely the frame is a sound component by which the direction of the speaking person can be detected correctly. For example, previous histograms could contain the effects of the sounds output by the speakers incorporated in the display device 4.

The initial syllables of each sentence pronounced by the speaking person become progressively larger in volume, thus representing a high degree of confidence. By contrast, the trailing syllables of the sentence pronounced by the person become gradually lower in volume, thus denoting a low degree of confidence. In such cases, the high degree of confidence is matched with a high confidence coefficient "c" and the low degree of confidence with a low confidence coefficient "c," whereby the speaking person's direction is suitably detected.

The video conferencing system 50 of the second embodiment is capable of detecting the speaking person's direction by removing the effects of reflected sounds from walls and other obstructions. The reflected sound from a wall or the like is explained below in reference to FIGS. 11A and 11B.

Figure 11A:
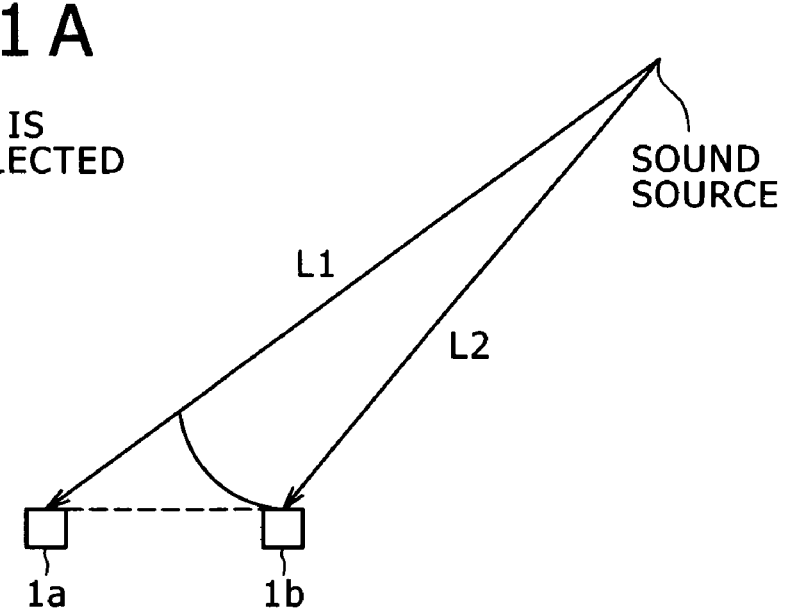
FIGS. 11A and 11B are schematic views explanatory of the effects of reflected sounds with regard to the second embodiment.

FIG. 11A shows an example in which the sound from the sound source is directly collected. In this case, the power ratio between microphones is known to be inversely proportional to the distance squared to the sound source. For example, suppose that the first and the second microphones 1a and 1b are 10 centimeters apart and that the distance L1 from the second microphone 1b to the sound source (i.e., speaking person) is 1 meter. In that case, if the distance L2 between the first microphone 1a and the sound source is approximated at 1.1 meters, then the ratio of L1 to L2 is 1 to 1.1 (L1:L2=1:1.1). If the power level of the first microphone 1a is represented by P1 and that of the second microphone 1b by P2, then the ratio of P1 to P2 is 1 to (1/1.21). That is, the power ratio of the first microphone 1a to the second microphone 1b is close to 1 to 1.

Figure 11B:
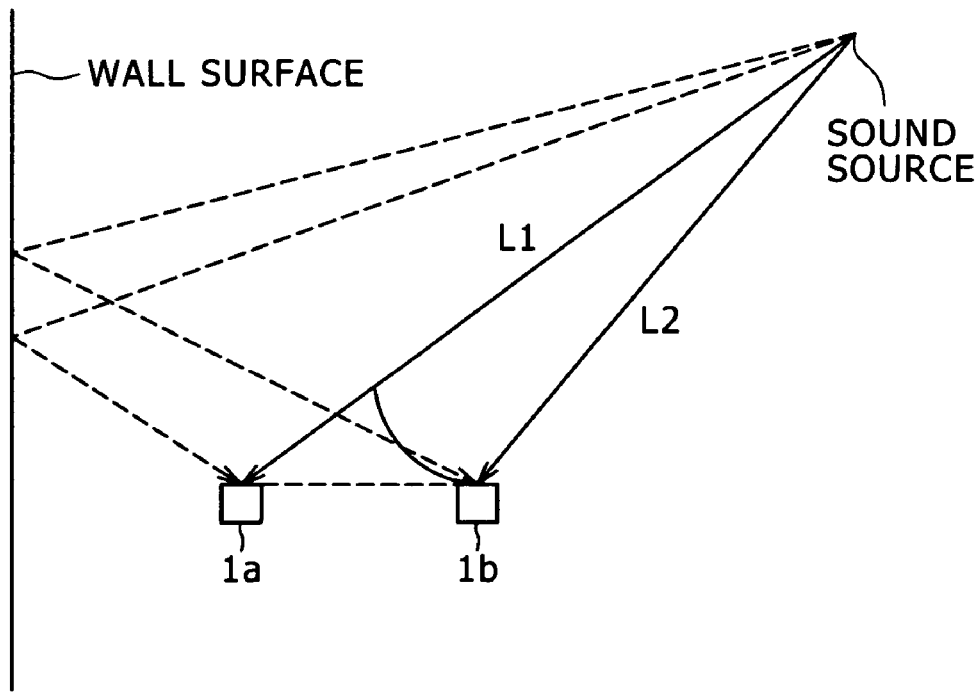
Figure 12A:
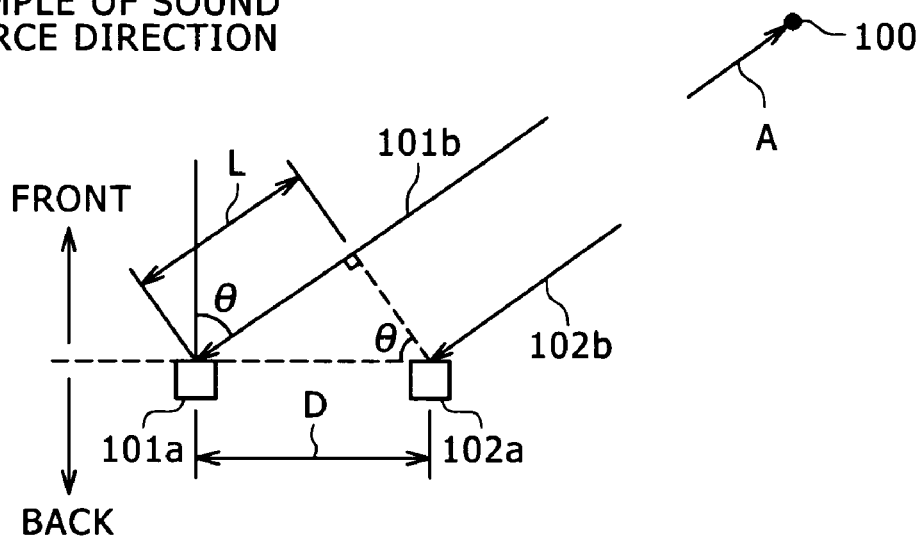
FIGS. 12A through 12C are schematic views explanatory of the common process for detecting the direction of a sound source.
Figure 12B:
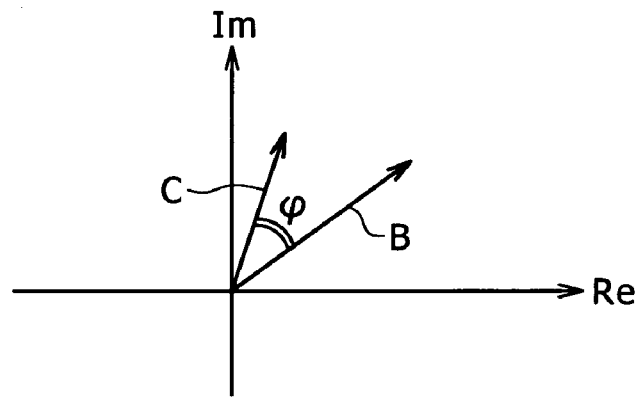
Figure 12C:
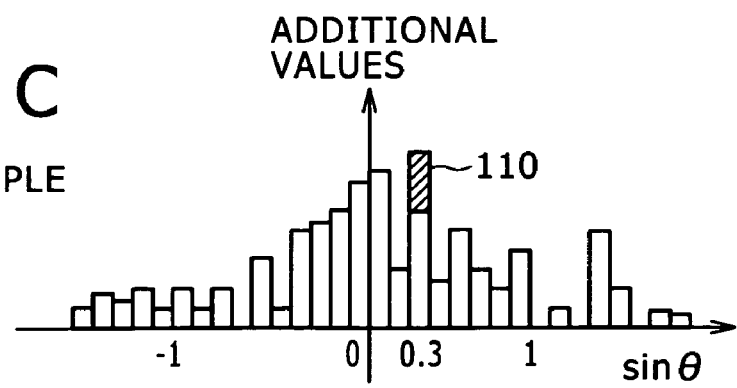
Figure 13A:
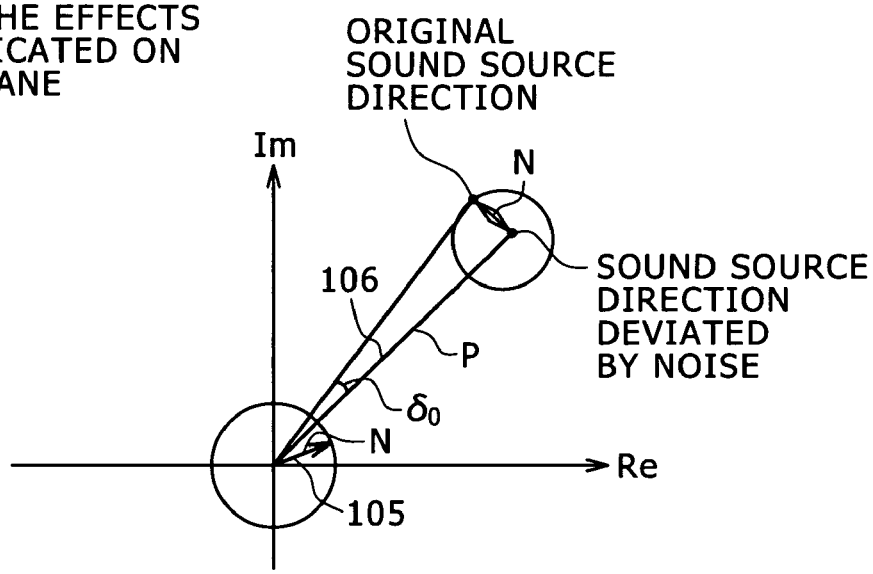
FIGS. 13A and 13B are graphic representations explanatory of the common process for detecting the sound source direction using a traditionally prepared histogram.
Figure 13B:
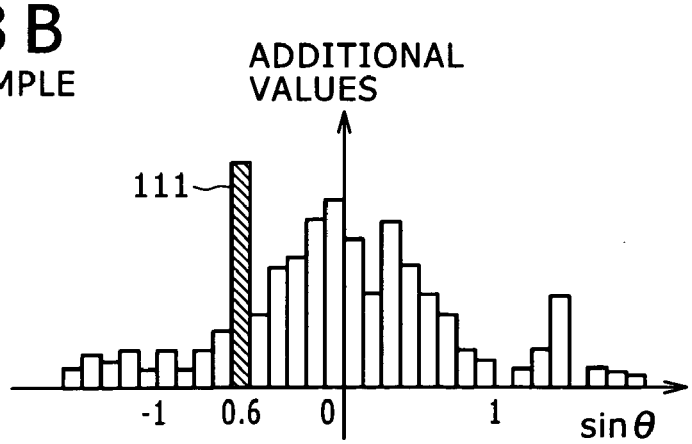

FIG. 11B shows an example in which the direct sound and reflected sound from a wall are mixed during sound collection. Under the influence of the reflected sound, the power ratio of the first microphone 1a to the second microphone 1b is no longer 1 to 1. In such a case, the power ratio may differ significantly at certain frequencies. This may desire reducing the proportions of added power levels to the histogram. The result is that the adverse effect of the reflected sound on the histogram is lowered. This in turn prevents erroneous detection of the sound source direction.

The sound source direction detecting apparatus 40 of the second embodiment described above is capable of detecting the sound source direction from consecutive audio frames. In the detecting process, the sound source direction detecting apparatus 40 stores the power levels of previously acquired audio frames subjected to histogram calculation, retrieves the stored power levels, and adds the retrieved values to the power levels of newly acquired audio frames. The continuous use of the information about previously detected sound source directions helps increase the accuracy of the current detection of the sound source direction.

If the difference in power level between the first microphone 1a and the second microphone 1b is conspicuous in a given frequency range, then the proportions of the power levels to be added to the histogram may be reduced accordingly. This measure takes into account the following factors: where merely direct sounds are involved, the difference in power level between microphones is inversely proportional to the distance squared from each microphone to the sound source. Where reflected sounds are also involved, the difference in power level between a plurality of sound-collecting microphones tends to become large because the phases of the mixed sounds reinforce and cancel out one another at the same time. For these reasons, in an ordinary setup where the sound source direction can be often detected incorrectly because of the mixed presence of direct and reflected sounds, the sound source direction detecting apparatus 40 of the second embodiment minimizes the adverse effects of the reflected sound in order to detect the sound source direction accurately.

In the foregoing description of the first and the second preferred embodiments, the control device was shown furnished with the sound source direction detecting apparatus. Alternatively, the sound source direction detecting apparatus may be installed directly inside the camera. This alternative structure allows the camera alone to detect the sound source direction and to point itself in the speaking person's direction. As another alternative, the sound source direction detecting apparatus may be established outside the control device. As a further alternative, the components making up the sound source direction detecting apparatus may be implemented using software programs. In this case, the functionality of the apparatus can be improved easily by downloading update programs from a suitable website.

It should be understood by those skilled in the art that various modifications, combinations, sub-combinations and alterations may occur depending on design requirements and other factor in so far as they are within the scope of the appended claims or the equivalents thereof.

What is claimed is:

1. A sound source direction detecting apparatus comprising:
    a plurality of microphones configured to collect sounds from a sound source in order to form an audio frame;
    a frequency decomposition section configured to decompose said audio frame into frequency components;
    an error range determination section configured to determine the effects of noises collected together with said sounds as an error range relative to phases;
    a power level dispersion section configured to disperse power levels of said sounds for each of the frequency components decomposed by said frequency decomposition section, on the basis of said error range determined by said error range determination section;
    a power level addition section configured to add the power levels dispersed by said power level dispersion section; and
    a sound source direction detection section configured to detect the direction of said sound source based on the phase at which is located the highest of the power levels added by said power level addition section.

2. A sound source direction detecting method comprising the steps of:
    decomposing an audio frame formed by a plurality of microphones collecting sounds from a sound source, into frequency components at intervals of a predetermined unit time;
    determining as an error range the effects of noises occurring around said sound source;
    dispersing power levels determined for the frequency components decomposed in said frequency decomposing step on the basis of said error range determined in said error range determining step;
    adding the dispersed power levels; and
    detecting the phase at which is located the highest of the added power levels as the direction of said sound source.

3. A sound source direction detecting camera comprising:
    a plurality of microphones configured to collect sounds from a sound source in order to form an audio frame;
    a frequency decomposition section configured to decompose said audio frame into frequency components at intervals of a predetermined unit time;
    an error range determination section configured to determine the effects of noises occurring around said sound source;
    a power level dispersion section configured to disperse power levels determined for the frequency components decomposed by said frequency decomposition section on the basis of said error range determined by said error range determination section;
    a power level addition section configured to add the power levels dispersed by said power level dispersion section; and
    a sound source direction detection section configured to detect as the direction of said sound source the phase at which is located the highest of the power levels added by said power level addition section.

4. A sound source direction detecting method comprising the steps of:
    decomposing a first audio frame formed by a plurality of microphones collecting sounds from a sound source, into frequency components at intervals of a predetermined unit time;
    adding power levels determined for each of the decomposed frequency components;
    detecting the direction of said sound source based on the phase at which the highest of the added power levels is located;
    smoothing the added power levels;
    storing the smoothed power levels; and
    adding the smoothed power levels derived from said first audio frame, to the power levels determined for each of the frequency components in a second audio frame formed by said plurality of microphones collecting the sounds continuing from said first audio frame.

5. A sound source direction detecting camera comprising:
a plurality of microphones configured to collect sounds from a sound source in order to form a first audio frame;
a frequency decomposition section configured to decompose said first audio frame into frequency components at intervals of a predetermined unit time;
a power level addition section configured to add power levels determined for each of the frequency components decomposed by said frequency decomposition section;
a sound source direction detection section configured to detect the direction of said sound source based on the phase at which is located the highest of the power levels added by said power level addition section;
an additional power level smoothing section configured to smooth the power levels added by said power level addition section; and
a smoothed additional power level storage section configured to store the smoothed power levels;
wherein said power level addition section adds the power levels derived from said first audio frame and retrieved from said smoothed additional power level storage section, to the power levels determined for each of the frequency components in a second audio frame formed by said plurality of microphones collecting the sounds continuing from said first audio frame.

6. A sound source direction detecting apparatus comprising:
a plurality of microphones configured to collect sounds from a sound source in order to form a first audio frame;
a frequency decomposition section configured to decompose said first audio frame into frequency components;
a power level addition section configured to add power levels determined for each of the frequency components decomposed by said frequency decomposition section;
a sound source direction detection section configured to detect the direction of said sound source based on the phase at which is located the highest of the power levels added by said power level addition section;
an additional power level smoothing section configured to smooth the power levels added by said power level addition section; and
a smoothed additional power level storage section configured to store the smoothed power levels;
wherein said power level addition section adds the power levels derived from said first audio frame and retrieved from said smoothed additional power level storage section, to the power levels determined for each of the frequency components in a second audio frame formed by said plurality of microphones collecting the sounds continuing from said first audio frame.

7. The sound source direction detecting apparatus according to claim 6, wherein said power level addition section multiplies the additional power levels determined for the frequency components decomposed from said first and said second audio frames, by a coefficient of confidence in order to make the direction of said sound source more accurate.

8. The sound source direction detecting apparatus according to claim 7, wherein said power level addition section adds low power levels to frequency components having high audio power ratios as opposed to the frequency components with low audio power ratios regarding the sounds collected by said plurality of microphones.

* * * * *